United States Patent
Gaur et al.

(10) Patent No.: US 9,645,756 B2
(45) Date of Patent: *May 9, 2017

(54) OPTIMIZATION OF IN-MEMORY DATA GRID PLACEMENT

(71) Applicant: INTERNATIONAL BUSINESS MACHINES CORPORATION, Armonk, NY (US)

(72) Inventors: Nitin Gaur, Round Rock, TX (US); Kulvir S. Bhogal, Pflugerville, TX (US); Christopher D. Johnson, Rochester, MN (US); Todd E. Kaplinger, Raleigh, NC (US); Douglas C. Berg, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,299

(22) Filed: May 24, 2016

(65) Prior Publication Data

US 2016/0266832 A1    Sep. 15, 2016

Related U.S. Application Data

(63) Continuation of application No. 13/154,294, filed on Jun. 6, 2011, now Pat. No. 9,405,589.

(51) Int. Cl.
  *G06F 3/06*   (2006.01)
  *G06F 11/14*  (2006.01)
  *G06F 9/50*   (2006.01)

(52) U.S. Cl.
  CPC ............ *G06F 3/0619* (2013.01); *G06F 3/061* (2013.01); *G06F 3/065* (2013.01); *G06F 3/067* (2013.01);
  (Continued)

(58) Field of Classification Search
  None
  See application file for complete search history.

(56) References Cited

U.S. PATENT DOCUMENTS 5,937,414 A    8/1999 Souder
7,657,781 B1   2/2010 Dixon
(Continued)

OTHER PUBLICATIONS

GigaSpaces, "XAP 8.0 Documentation" [online]. Jun. 24, 2010 [retrieved on Jan. 27, 2013]. Retrieved from the Internet: <URL:http://wiki.gigaspaces.com/wiki/display/XAP8/8.0+Documentation+Home>. Additional Section: Failover.*

(Continued)

*Primary Examiner* — Edward Dudek, Jr.
*Assistant Examiner* — Ralph A Verderamo, III
(74) *Attorney, Agent, or Firm* — Shimokaji IP

(57) ABSTRACT

A method, system, and program product for optimizing distribution and availability of data partitions is disclosed. Placement logic is run for data partition distribution which optimizes a configuration of a memory data grid. A determination of a change in performance of the memory data grid after adding new members to the memory data grid is provided. Replication of data partitions in the memory data grid is minimized. Optimum data partition distribution in the memory data grid is determined.

21 Claims, 7 Drawing Sheets

(52) U.S. Cl.
CPC .......... *G06F 3/0631* (2013.01); *G06F 3/0644* (2013.01); *G06F 9/5072* (2013.01); *G06F 11/1425* (2013.01); *G06F 11/1464* (2013.01)

(56) References Cited

U.S. PATENT DOCUMENTS

| | | | |
|---|---|---|---|
| 7,739,233 | B1 | 6/2010 | Ghemawat |
| 8,055,943 | B2 | 11/2011 | Edel |
| 8,341,115 | B1 | 12/2012 | Natanzon |
| 2003/0041074 | A1 | 2/2003 | Vasudevan |
| 2004/0153604 | A1 | 8/2004 | Nagasawa |
| 2006/0195666 | A1 | 8/2006 | Maruyama |
| 2006/0224845 | A1 | 10/2006 | Hiraiwa |
| 2006/0227913 | A1 | 10/2006 | Sedarat |
| 2007/0078911 | A1 | 4/2007 | Lee |
| 2008/0244035 | A1 | 10/2008 | Horie |
| 2008/0244306 | A1 | 10/2008 | Kumagai |
| 2008/0301256 | A1 | 12/2008 | McWilliams |
| 2009/0125691 | A1 | 5/2009 | Nakanishi |
| 2009/0171732 | A1 | 7/2009 | Bobak |
| 2009/0240664 | A1 | 9/2009 | Dinker |
| 2010/0036851 | A1 | 2/2010 | Paterson-Jones |
| 2010/0275055 | A1 | 10/2010 | Edel |
| 2011/0040792 | A1 | 2/2011 | Perry |
| 2011/0307514 | A1 | 12/2011 | Goodman |
| 2012/0179652 | A1 | 7/2012 | Glaude |
| 2013/0007741 | A1 | 1/2013 | Britsch |
| 2013/0013766 | A1 | 1/2013 | Britsch |
| 2014/0359349 | A1 | 12/2014 | Grube |

OTHER PUBLICATIONS

GigaSpaces, "XAP 8.0 Documentation" [online]. Jun. 24, 2010 [retrieved on Jan. 27, 2013]. Retrieved from the Internet: <URL:http://wiki.gigaspaces.com/wiki/display/XAP8./8.0+Documentation+Home>.Additional Section: Replication Topologies.

GigaSpaces, "XAP 8.0 Documentation" [online]. Jun. 24, 2010 [retrieved on Jan. 27, 2013]. Retrieved from the Internet: <URL:http://wiki.gigaspaces.com/wiki/display/XAP8./8.0+Documentation+Home>.Sec. Elastic Processing Unit; Space Toplogies; The In-Memory Data Grid; Multi-Site Replication over the WAN; Packaging and Deployment; GigaSpaces Management Center.

Lin et al., "Optimal Placement of Replicas in Data Grid Environments with Locality Assurance", Proceedings of the 12th International Conference on Parallel and Distributed Systems, 2006.

Gu et al., "Dynamic Replica Placement and Location Strategies for Data Grid", 2008 International Conference on Computer Science and Software Engineering, 2008.

Voicu et al., "Replicated Data Management in the Grid: The Re:GRIDiT Approach", DaGreS'09, May 18-20, 2009.

Sato et al., "Access-Pattern and Bandwidth Aware File Replication Algorithm in a Grid Environment", Tokyo Institute of Technology—National Institute of Informatics, 9th Grid Computing Conference, IEEE 2008.

Gerson Diner, Clusters Over WAN [online]. Jan. 30, 2011 [retrieved on Jan. 27, 2013]. Retrieved from the Internet: <URL:http://wiki.gigaspaces.com/wiki/pages/viewpage.action?pageId=56427412>.

Wu et al ("Efficient B-tree Based Indexing for Cloud Data Processing", Proceedings of VLDB Endowment, vol. 2, No. 1, 2010).

Kaufman et al. (American Institute of Physics, Aug. 1993, "Grid Computing Made Simple", pp. 31-33).

* cited by examiner

OPTIMIZATION OF IN-MEMORY DATA GRID PLACEMENT

The present application is a continuation of U.S. application Ser. No. 13/154,294.

BACKGROUND

The present invention relates generally to the field of data management and more specifically to optimizing data placement on an in-memory data grid.

Zones, or data centers, may be geographically dispersed, and may be vulnerable to network latency and occasional failures (brown-outs). With an increase in data in a data grid, there may be a proportional decrease in available memory.

Hence, there is a need for a more efficient system and method for accessing data partitions through optimized data partition placement.

SUMMARY

According to embodiments of the present invention, a method and computer program product for optimizing data partition distribution in a memory data grid are provided, which comprise running placement logic for optimizing configuration of the memory data grid; determining performance change of the memory data grid after adding new members to the memory data grid for adding available space to the memory data grid; minimizing replication of one of a plurality of data partitions in the memory data grid for stabilizing the memory data grid; and determining optimum data partition distribution in the memory data grid based on network topology.

According to another embodiment of the present invention, a system comprises a computer including a computer processor for optimizing data partition distribution in a memory data grid; and a data partition optimization engine for synchronizing the data partitions, the data partition optimization engine being operable to run placement logic for data partition distribution which optimizes a configuration of a memory data grid; determine performance change of the memory data grid after adding new members to the memory data grid for adding available space to the memory data grid; and determine optimum data partition distribution in the memory data grid based on network topology, and by observing network latency, disaster recovery parameters, grid size, and grid performance for containers placed in the memory data grid.

The above and below advantages and features are of representative embodiments only, and are not exhaustive and/or exclusive. They are presented to assist in understanding the invention. It should be understood that they are not to be considered limitations on the invention as defined by the claims, or limitations on equivalents to the claims. Additional features and advantages of the invention will become apparent in the following description, from the drawings, and from the claims. These and other features, aspects and advantages of the present invention will become better understood with reference to the following drawings, description and claims.

DETAILED DESCRIPTION

Figure 1:
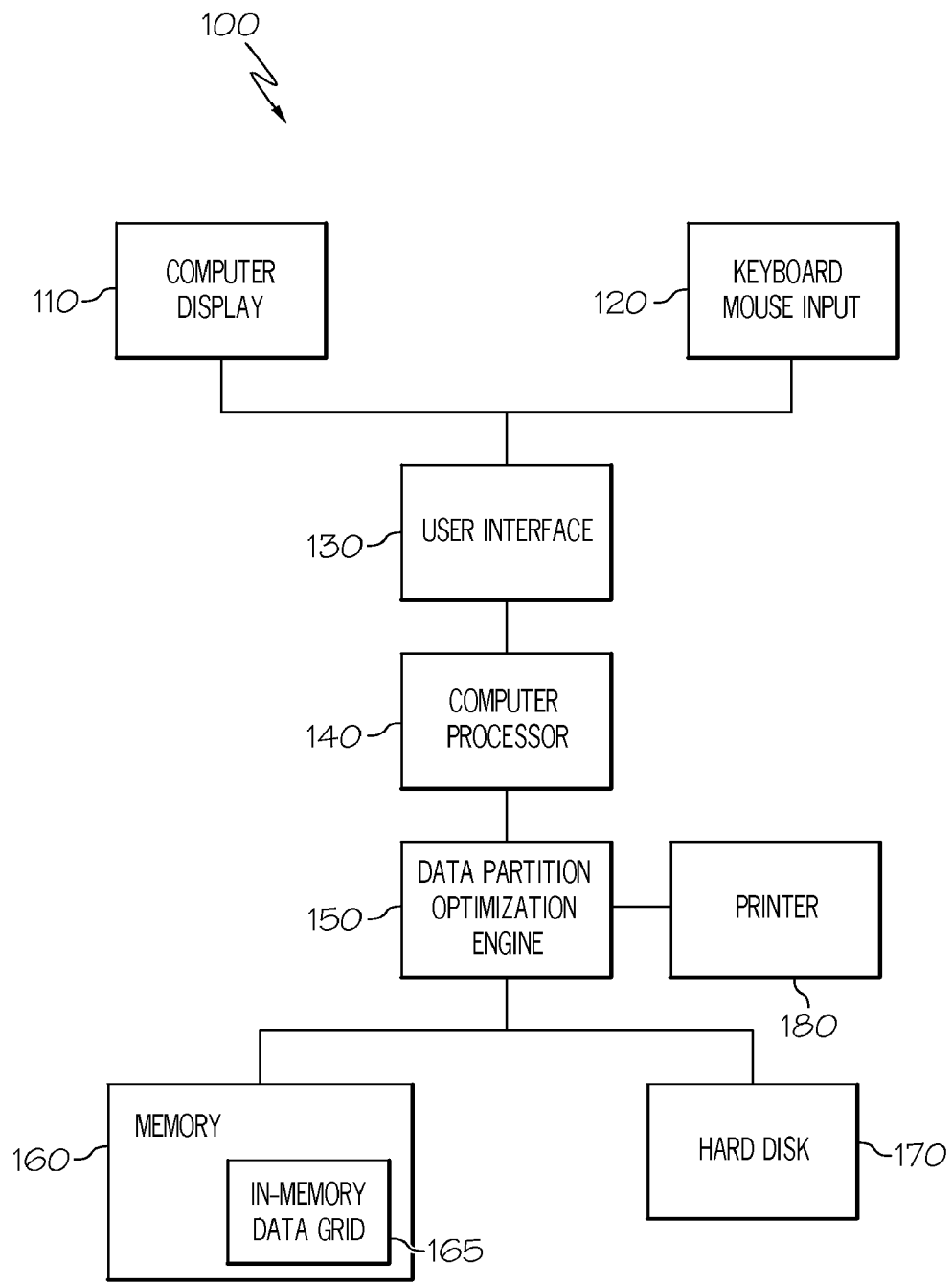
FIG. 1 is a block diagram of a system according to one exemplary embodiment of the invention.

Described is a method, computer program product and system for policy based zone placement of data partitions to achieve optimized usage and availability of an in-memory data grid. A data partition may also be termed a data shard.

The present invention optimizes placement and availability of data partitions in an in-memory data grid based on available resources and network topology in ways not heretofore available including dynamic data partition synchronization of the in-memory data grid.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of a system 100 according to an exemplary embodiment of the invention. The system 100 may include a computer display 110, a keyboard and mouse 120, a user interface 130, a computer processor 140, a data partition optimization engine 150, memory 160 with an in-memory data grid 165, a hard disk 170, and a printer 180.

A user may utilize the invention by operating the user interface 130 with the keyboard and mouse 120. The user may utilize the system 100 by inputting data and instructions from the user interface 130 for processing by the data partition optimization engine 150. The data partition optimization engine may be processed by a computer with a computer processor 140. The user interface 130 and the data partition optimization engine 150 may be stored in computer memory, for example, random access memory 160 and on a hard disk 170. Within the random access memory 160 may be stored an in-memory data grid 165. The user may also print operations from the user interface 130 on the printer 180.

Figure 2:
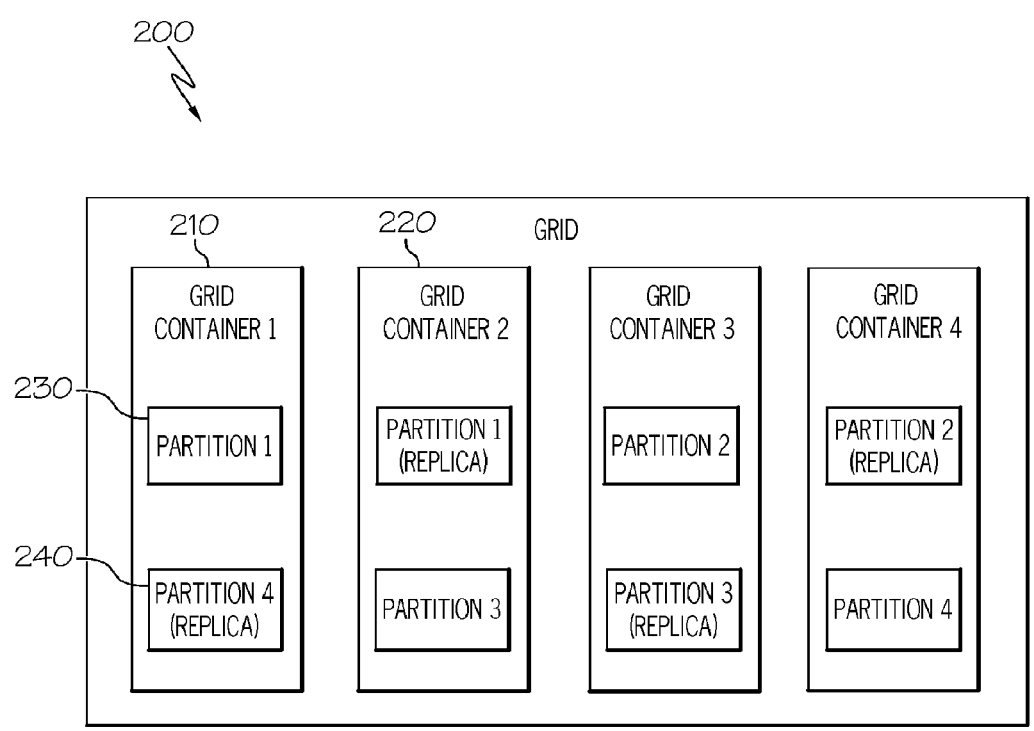
FIG. 2 is block diagram illustrating an in-memory data grid.

FIG. 2 may further describe the in-memory data grid 165 from FIG. 1. FIG. 2 illustrates an in-memory data grid 200 prior to distribution of data partitions. As shown in FIG. 2, the in-memory data grid 200 is shown with multiple containers including Grid Container 1 (210) and Grid Container 2 (220). Each container may contain partitions. For example, Grid Container 1 210 in FIG. 2 is shown with two partitions, Partition 1 (230), and Partition 4 (240). Containers may include replicas of partitions. Replicas of partitions may be placed in other containers in case one of the containers crashes.

Figure 3:
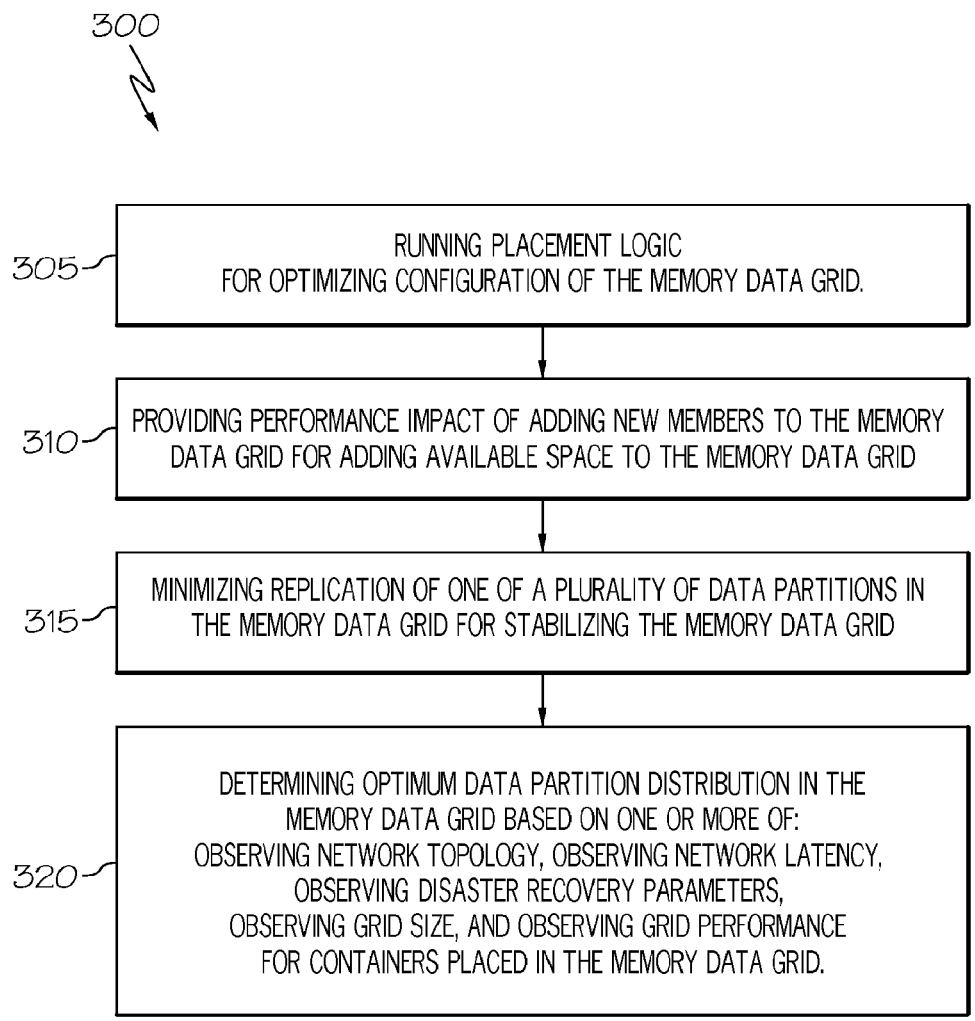
FIG. 3 is a flowchart of an exemplary embodiment of the invention.

An exemplary embodiment of the invention from FIG. 1 may be shown in FIG. 3.

As shown in FIG. 3, an exemplary method of the invention 300 may include a step 305 of running placement logic for optimizing configuration of the memory data grid. For example, placement logic may be based on factors such as network latency. A step 310 may include providing performance change in the memory data grid after adding new members to the memory data grid for adding available space to the memory data grid. For example, adding new grid containers may cause additional stress to in-memory housekeeping operations, or may increase availability. A step 315 may include minimizing replication of one of a plurality of data partitions in the memory data grid for stabilizing the memory data grid. For example, replication may be shut off until the memory is stable or until enough grid members are available to handle current capacity. A step 320 may include determining optimum data partition distribution in the memory data grid based on one or more of: observing network topology, observing network latency, observing disaster recovery parameters, observing grid size, and observing grid performance for containers placed in the memory data grid. For example, observing network topology may determine the optimum number of containers for the available partitions. Observing network latency may include determining the amount of congestion in the memory. If adding another container adds the memory housekeeping operations, then the network latency may increase. Observing disaster recovery parameters may include determine available backup memory. Observing grid size may include determining an optimum grid size for the available number of stored partitions. Observing grid performance for containers placed in a grid may include if one or more containers are crashing or not performing adequately, then underperforming containers may be removed.

Figure 4:
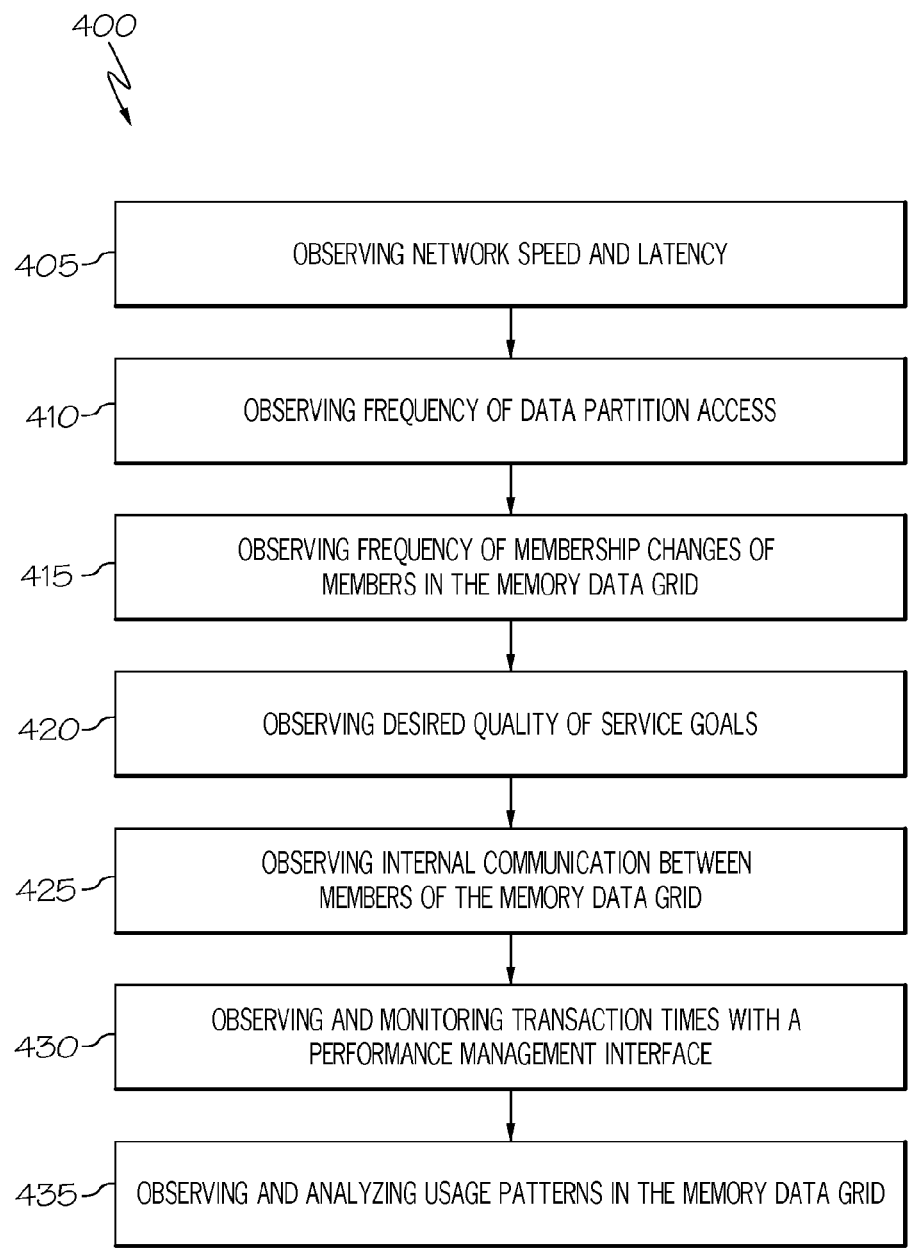
FIG. 4 is a flowchart of an exemplary embodiment of the invention including additional factors for determining optimum data partition distribution.

Exemplary processing in the system 100 of FIG. 1 may be described with reference to FIG. 4. FIG. 4 is an exemplary embodiment of the Data Partition Optimization Engine 150 of FIG. 1 showing additional factors 400 that may be considered in determining data partition distribution from that shown in FIG. 3.

As shown in FIG. 4, additional factors 400 that may be considered in determining data partition distribution may include 405 observing network speed and latency, 410 observing frequency of data partition access, 415 observing frequency of membership changes of members in the memory data grid that are detected by the memory data grid, 420 observing desired quality of service goals, 425 observing internal communication between members of the memory data grid, 430 observing and monitoring transaction times with a performance management interface for moving partitions in the memory data grid, and 435 analyzing usage patterns in the memory data grid.

Figure 5:
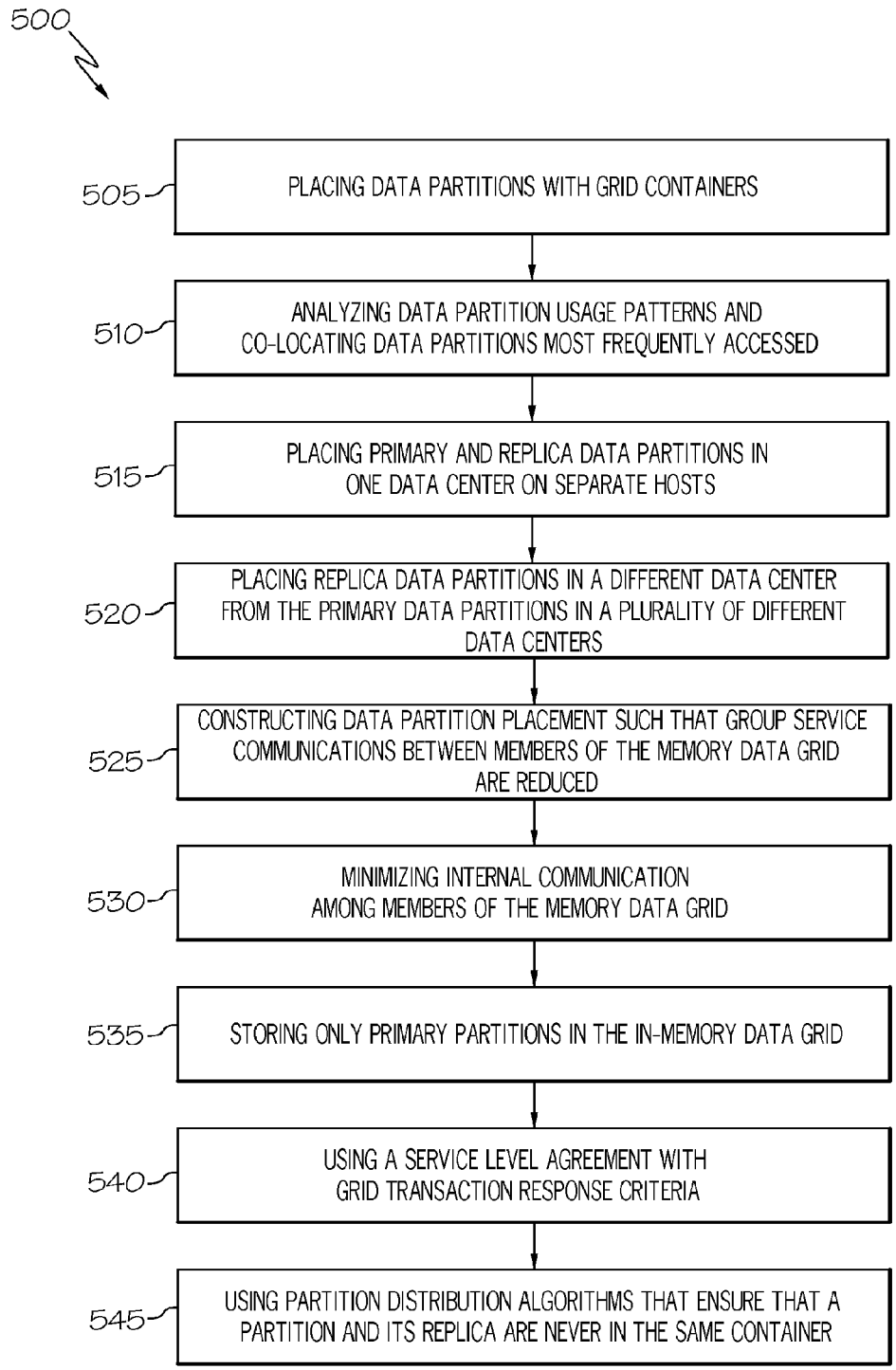
FIG. 5 is a flowchart of an exemplary embodiment of the invention including additional processing for optimizing data partition distribution.

Exemplary processing in the system 100 of FIG. 1 may be described with reference to FIG. 5. FIG. 5 is an exemplary embodiment of the Data Partition Optimization Engine 150 of FIG. 1 showing additional processing 500 that may be performed in optimizing data partition distribution from that shown in FIG. 3.

As shown in FIG. 5, additional processing 500 that may be performed in optimizing data partition distribution may include a step 505 of placing data partitions with grid containers to reduce invalidation and replication traffic, a step 510 of analyzing data partition usage patterns and co-locating data partitions most frequently accessed, a step 515 of placing primary and replica data partitions in one data center on separate hosts, a step 520 of placing replica data partitions in a different data center from the primary data partitions in a plurality of different data centers, a step 525 of constructing data partition placement such that group service communications between members of the memory data grid are reduced, a step 530 of minimizing internal communication among members of the memory data grid, a step 535 of selecting partitions such that only primary partitions are stored in the in-memory data grid, a step 540 of using a service level agreement with grid transaction response criteria, and a step 545 of using partition distribution algorithms that ensure that a partition and its replica are never in the same container for enhancing fault tolerance and high availability of partitions. For example, a service level agreement may be used as a policy such that if the service level agreement is not met, replication of the data partitions may be shut off.

Figure 6:
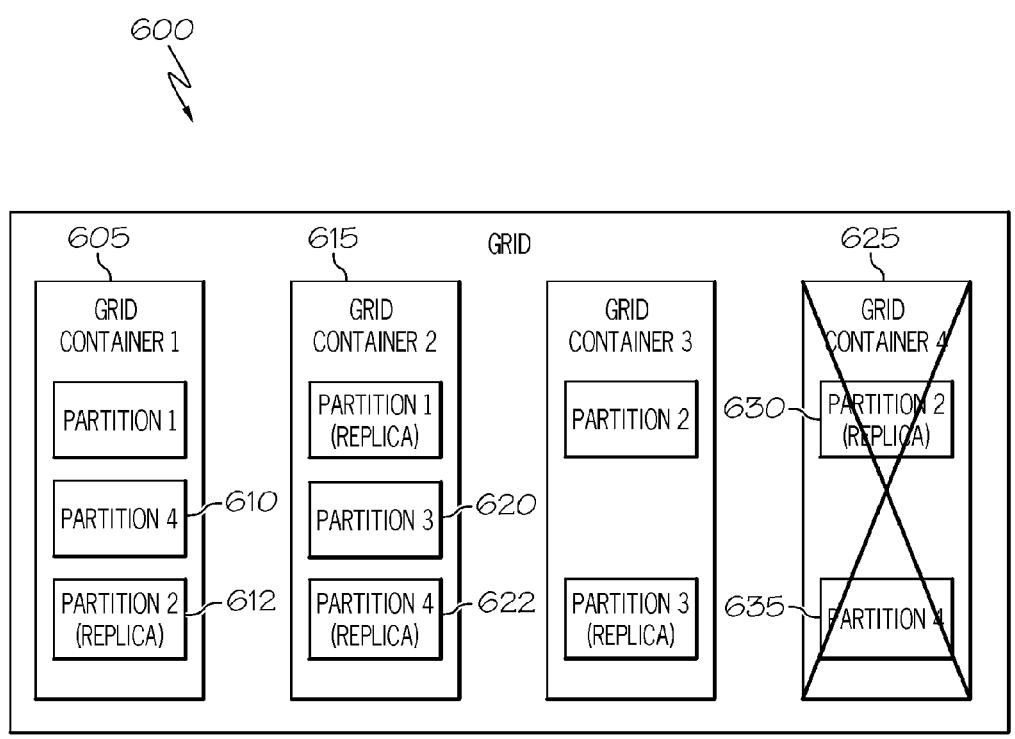
FIG. 6 is a block diagram illustrating the in-memory data grid of FIG. 3 after data partition distribution.

The data partition distribution as referenced in step 305 of FIG. 3 may be described with reference to FIG. 6. FIG. 6 shows an in-memory data grid after redistribution of data partitions. Partition 2 (630) and Partition 4 (635) in Grid Container 4 (625) may be redistributed to the surviving containers. The replica of Partition 4 in Grid Container 1 (605) may be converted to a primary partition. A replica of Partition 4 (622) may be created on Grid Container 2 (615). A replica of Partition 2 (612) may be redistributed to Grid Container 1 (605). Grid Container 4 as shown at block 625 may then be removed.

Figure 7:
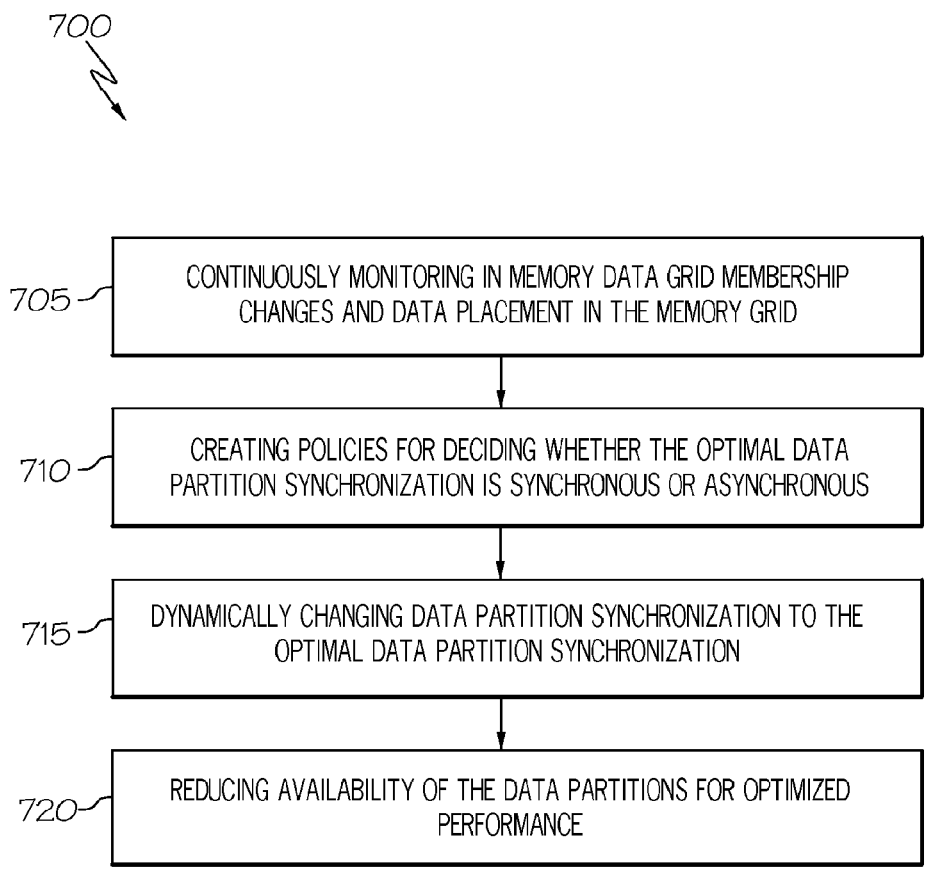
FIG. 7 is a flowchart of an exemplary embodiment of the invention including data partition synchronization.

Exemplary processing in the system 100 of FIG. 1 may be described with reference to FIG. 7. FIG. 7 is an exemplary embodiment of the Data Partition Optimization Engine 150 of FIG. 1 showing a policy driven approach for data partition distribution.

As shown in FIG. 7, a method of optimizing data partition distribution 700 may include a step 705 of continuously monitoring in memory data grid membership changes and data placement in the memory grid. A step 710 may include creating policies for deciding whether the optimal data partition distribution requires synchronization that is synchronous or asynchronous. A step 715 may include dynamically changing the data partition synchronization to an optimal data partition synchronization based on one of the polices. For example, data partition synchronization may be dynamically changed from asynchronous to synchronous based on which results in better performance.

A step 720 may include optimizing the data partition distribution by reducing availability of data partitions for a reduction in data traffic. Reducing availability of partitions may result in faster data access and reduced stress on a database.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claim

What is claimed is:

1. A method for optimizing data partition distribution in a memory data grid which includes a plurality of data partitions, comprising:
synchronizing the plurality of data partitions;
running placement logic for a data partition distribution which optimizes a configuration of a memory data grid;
determining performance change of the memory data grid after adding new members to the memory data grid for adding available space to the memory data grid;
determining whether the memory data grid will become unstable if at least one of the synchronized plurality of data partitions is added, wherein a created data partition replication is shut off when it is determined that the memory data grid will become unstable if the at least one of the synchronized plurality of data partitions is added;

turning the created data partition replication on and off based on availability in the memory data grid to replicate all of the synchronized plurality of data partitions;

creating one or more replica data partitions from the plurality of data partitions;

converting a first one of the replica data partitions to a corresponding primary data partition;

determining an optimal data partition distribution in the memory data grid based on network topology and by observing network latency, disaster recovery parameters, grid size, and grid performance for containers placed in the memory data grid;

creating a plurality of policies for deciding whether synchronization of the optimal data partition distribution should be synchronous or asynchronous;

reducing invalidation traffic by placing the synchronized plurality of data partitions with the containers in the memory data grid; and dynamically changing a data partition synchronization to an optimal data partition synchronization based on one of the polices.

2. The method of claim 1, wherein determining optimum partition distribution in the memory data grid includes a policy driven by a service level agreement with a grid transaction response criteria.

3. The method of claim 1, wherein determining the optimal data partition distribution in the memory data grid includes a data partition distribution algorithm which ensures that primary and replica data partitions are not in a same container.

4. The method of claim 1, wherein determining the optimal data partition distribution in the memory data grid includes monitoring data partition placements and grid membership changes.

5. The method of claim 1, wherein determining the optimal data partition distribution in the memory data grid includes monitoring transaction times with a performance management interface.

6. The method of claim 1, wherein determining the optimal data partition distribution in the memory data grid includes analyzing usage patterns of the synchronized plurality of data partitions.

7. The method of claim 1, determining optimum data partition distribution in the memory data grid includes determining whether optimal replication of the synchronized plurality of data partitions is synchronous or asynchronous.

8. A computer program product for optimizing data partition distribution in a memory data grid, the computer program product including a non-transitory machine-readable storage medium having computer readable code embodied therewith, the computer readable program code comprising:

computer readable program code that optimizes a data partition distribution in a memory data grid which includes a plurality of data partitions; and computer readable program code that synchronizes the plurality of data partitions;

computer readable program code that runs placement logic for the data partition distribution which optimizes a configuration of the memory data grid;

computer readable program code that determines a performance change in the memory grid after adding new members to the memory data grid for adding available space to the memory data grid;

computer readable program code that determines whether the memory data grid will become unstable if at least one of the synchronized plurality of data partitions is added, wherein a created data partition replication is shut off when it is determined that the memory data grid will become unstable if the at least one of the synchronized plurality of data partitions is added;

computer readable program code that turns the created data partition replication on and off based on availability in the memory data grid to replicate all of the synchronized plurality of data partitions;

computer readable program code that creates one or more replica data partitions from the synchronized plurality of data partitions;

computer readable program code that converts one of the replica data partitions to a corresponding primary data partition;

computer readable program code that determines an optimal data partition distribution in the memory data grid based on network topology, and by observing network latency, disaster recovery parameters, grid size, and grid performance for containers placed in the memory data grid;

computer readable program code that creates a plurality of policies for deciding whether synchronization of the optimal data partition distribution should be synchronous or asynchronous;

computer readable program code that reduces invalidation traffic by placing the synchronized plurality of data partitions with the containers in the memory data grid; and computer readable program code that dynamically changes a data partition synchronization to an optimal data partition synchronization based on one of the polices.

9. The computer program product of claim 8, wherein determining the optimal partition distribution in the memory data grid includes a policy driven by a service level agreement with grid transaction response criteria.

10. The computer program product of claim 8, wherein determining the optimal data partition distribution in the memory data grid includes a data partition distribution algorithm which ensures that primary and replica data partitions are not in a same container.

11. The computer program product of claim 8, wherein determining the optimal data partition distribution in the memory data grid includes monitoring data partition placements and grid membership changes.

12. The computer program product of claim 8, wherein determining the optimal data partition distribution in the memory data grid includes monitoring transaction times with a performance management interface.

13. The computer program product of claim 8, wherein determining the optimal data partition distribution in the memory data grid includes analyzing usage patterns of the synchronized plurality of data partitions.

14. The computer program product of claim 8, wherein determining the optimal data partition distribution in the memory data grid includes determining whether optimal replication of the synchronized plurality of data partitions is synchronous or asynchronous.

15. A system comprising:
a computer including a computer processor for optimizing data partition distribution in a memory data grid which includes a plurality of data partitions; and
a data partition optimization engine for synchronizing the plurality of data partitions, the data partition optimization engine being operable to:
run placement logic for data partition distribution which optimizes a configuration of the memory data grid;
determine performance change of the memory data grid after adding new members to the memory data grid for adding available space to the memory data grid;
determine whether the memory data grid will become unstable if at least one of the synchronized plurality of data partitions is added, wherein a created data partition replication is shut off when it is determined that the memory data grid will become unstable if the at least one of the plurality of data partitions is added;
turn a replication of the data partitions on and off based on availability in the memory data grid to replicate all of the synchronized plurality of data partitions; create one or more replica partitions from the synchronized plurality of data partitions;
convert one of the replica data partitions to a corresponding primary data partition;
determine an optimal data partition distribution in the memory data grid based on network topology, and by observing network latency, disaster recovery parameters, grid size, and grid performance for containers placed in the memory data grid;
create a plurality of policies for deciding whether synchronization of the optimal data partition distribution should be synchronous or asynchronous;
reduce invalidation traffic by placing the synchronized plurality of data partitions with the containers in the memory data grid; and
dynamically change a data partition synchronization to an optimal data partition synchronization based on one of the polices.

16. The system of claim 15, wherein determining the optimal partition distribution in the memory data grid includes a policy driven by a service level agreement with grid transaction response criteria.

17. The system of claim 15, wherein determining the optimal data partition distribution in the memory data grid includes a data partition distribution algorithm which ensures that primary and replica data partitions are not in a same container.

18. The system of claim 15, wherein determining the optimal data partition distribution in the memory data grid includes monitoring data partition placements and grid membership changes.

19. The system of claim 15, wherein determining the optimal data partition distribution in the memory data grid includes monitoring transaction times with a performance management interface.

20. The system of claim 15, wherein determining the optimal data partition distribution in the memory data grid includes analyzing usage patterns of the the synchronized plurality of data partitions.

21. The system of claim 15, determining the optimal data partition distribution in the memory data grid includes determining whether optimal replication of the synchronized plurality of data partitions is synchronous or asynchronous.

* * * * *